United States Patent
Schuster

(10) Patent No.: US 6,277,210 B1
(45) Date of Patent: Aug. 21, 2001

(54) SILVER BRAZING FLUX

(75) Inventor: Jerry L. Schuster, Newfields, NH (US)

(73) Assignee: Omni Technologies Corporation, Epping, NH (US)

( * ) Notice: Subject to any disclaimer, the term of this patent is extended or adjusted under 35 U.S.C. 154(b) by 0 days.

(21) Appl. No.: 09/603,317

(22) Filed: Jun. 24, 2000

Related U.S. Application Data

(60) Provisional application No. 60/141,165, filed on Jun. 25, 1999.

(51) Int. Cl.⁷ .................................................... B23K 35/363
(52) U.S. Cl. .................................................. 148/26; 148/23
(58) Field of Search ........................................ 148/23, 26

(56) References Cited

U.S. PATENT DOCUMENTS

| | | | |
|---|---|---|---|
| 4,482,607 | * 11/1984 | Neelameggham et al. | 428/403 |
| 5,781,846 | * 7/1998 | Jossick | 419/66 |
| 5,984,161 | * 11/1999 | Koch et al. | 228/56.3 |

* cited by examiner

*Primary Examiner*—Daniel Jenkins
(74) *Attorney, Agent, or Firm*—Michael J. Persson; Lawson, Philpot & Persson, P.C.

(57) ABSTRACT

A non-corrosive, non-hygroscopic silver brazing flux compound. In the preferred embodiment, the flux compound consists of potassium fluoroborate approximately 26% by weight, boric acid approximately 26% by weight, potassium bifluoride approximately 24% by weight, potassium tetraborate approximately 20% by weight, and potassium carbonate approximately 3.5% by weight. The method of making the flux compound and its non-corrosive and non-hygroscopic properties enables the flux compound to be especially suitable for use as either as a flux paste or dried and milled into a powder to be dispensed within a sheath of silver based filler material to form a flux cored brazing wire.

6 Claims, No Drawings

SILVER BRAZING FLUX

CLAIM OF PRIORITY

This patent application claims the benefit of priority of U.S. Provisional Patent Application Ser. No. 60/141,165, filed Jun. 25, 1999.

FIELD OF THE INVENTION

The present invention relates to the field of silver brazing and, in particular, to a silver brazing flux that is non-corrosive and non-hygroscopic in nature.

BACKGROUND OF THE INVENTION

For many years, metal parts have been joined using silver-based brazing compounds. As is well known in the art, it is necessary to prepare the surfaces to be joined prior to applying the brazing compounds in order to provide adhesion of the brazing compound to the surfaces to be joined. This preparation is typically performed by a flux material, which is applied to the joint and activated by the application of heat to the joint. Once activated, the flux thoroughly cleans the surfaces to the joined and removes any oxides that will degrade the strength of the brazed joint.

As they must aggressively clean the surfaces to be joined, fluxes have typically been highly corrosive and hygroscopic in nature. Accordingly, it is necessary in many applications to remove any residual flux or flux residue from the joined parts in order to prevent corrosion of the parts. This removal increases the overall costs of the parts, due to the additional process steps and the cost of waste disposal from the cleaning process. In addition, the waste generated by this cleaning is hazardous to humans and harmful to the environment.

Finally, because of their corrosiveness and affinity for absorbing water, many typical fluxes have not been adapted for use in flux cored wires. As this is the case, the use of these fluxes has necessitated the additional step of applying the flux in a paste form prior to heating and joining the parts. As was the case with the cleaning step described above, the need to perform this additional step increases the overall cost of the joined parts.

Accordingly, there is a need for a flux for use with silver brazing compositions that effectively prepares the surfaces to be joined, is non-corrosive and non-hygroscopic and, accordingly, does not need to be cleaned from joined surfaces after they are joined, and may be formed into a powder for disposal within a flux cored wire.

SUMMARY OF THE INVENTION

The present invention is a silver brazing flux that is non-corrosive and non-hygroscopic in nature, and a method of making this flux. In it most basic form, the flux includes the following compounds in the following percentages by weight:

TABLE 1

Composition of Basic Flux Compound

| COMPOUND | PERCENTAGE BY WEIGHT |
| --- | --- |
| Potassium Fluoroborate | 21%–31% |
| Boric Acid | 21%–31% |
| Potassium Bifluoride | 19%–29% |
| Potassium Tetraborate | 15%–25% |
| Potassium Carbonate | 2.5%–4.5% |

In some embodiments, the flux is combined with de-ionized water, or other suitable binder materials, to form a flux paste. In other embodiments, the flux is mixed and dried into a powder and dispensed within a sheath of silver based filler material, using the process described in U.S. Pat. No. 5,781,846, which is incorporated herein by reference, to form a flux cored brazing composition.

The preferred flux includes the same compounds in the following percentages by weight:

TABLE 2

Composition of Preferred Flux Compound

| COMPOUND | PERCENTAGE BY WEIGHT |
| --- | --- |
| Potassium Fluoroborate | 26.3% |
| Boric Acid | 26.3% |
| Potassium Bifluoride | 23.8% |
| Potassium Tetraborate | 20.2% |
| Potassium Carbonate | 3.5% |

The basic method of making the flux includes the following steps:

Weighing all ingredients such that desired percentages are identified.

Adding boric acid on top of potassium bifluoride.

Mixing the boric acid and potassium bifluoride at medium-low speed until a completely smooth wet paste is formed.

Adding potassium tetraborate and mixing at medium low speed.

Adding potassium carbonate to the paste and mixing until it is completely dissolved Adding de-ionized water to each step of the mixture as it begins to stiffen in order to keep a loose, smooth consistency, similar to that of cake frosting, and scraping the sides and bottom of the mixing bowl as needed to keep the mix even Mixing the paste at medium speed.

Stopping the mixer and pouring the mixture into a pan.

Placing the pan into a pre-heated oven at approximately 560 degrees Fahrenheit for a period of four hours such that substantially all de-ionized water is dried from the mixture.

Removing the dried flux, milling to a powder and screening to a desired particle size.

The resulting flux powder is non-corrosive and non-hygroscopic, and is readily adapted for suspension within a paste or disposition within a sheath of brazing alloy to form a flux cored brazing composition.

Therefore, it is an aspect of the invention to provide a silver brazing flux that is non-corrosive.

It is a further aspect of the invention to provide a silver brazing flux that is non-hygroscopic.

It is a further aspect of the invention to provide a silver brazing flux that does not leave a residue that must be cleaned from surfaces after they are joined.

It is a further aspect of the invention to provide a silver brazing flux that effectively prepares surfaces for joining.

It is a further aspect of the invention to provide a silver brazing flux that may be formed into a powder.

It is a further aspect of the invention to provide a silver brazing flux that may be combined with a silver brazing alloy to form flux cored brazing composition.

It is a still further aspect of the invention to provide a silver brazing flux that may be combined with a binder material to form a flux paste.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

The present invention is a silver brazing flux that is non-corrosive and non-hygroscopic in nature and a method of making the flux. As set forth in the summary section above, the flux is a mixture of potassium fluoroborate, boric acid, potassium bifluoride, potassium tetraborate and potassium carbonate. When combined in the percentages set forth above, the resulting flux provides excellent surface preparation characteristics and is both non-corrosive and non-hygroscopic.

In some embodiments, the flux is combined with de-ionized water, or other suitable binder materials, to form a flux paste. In these embodiments, the flux paste is applied to the faying surfaces prior to the application of heat, and is subsequently heated until it flows and wicks across the faying surfaces, effectively preparing the surfaces for joining. Once the surfaces are prepared, a solid wire of a silver based brazing composition is brought into contact with the heated surfaces, causing the brazing composition to flow across the surfaces and, once cooled, to effectively join the surfaces together.

In other embodiments, the flux is mixed and dried into a powder and dispensed within a sheath of silver based filler material, to form a flux cored brazing composition. In these embodiments the faying surfaces are heated and the flux cored brazing composition is brought into contact with the heated surfaces, causing the flux to melt and flow and subsequently causing the brazing composition to melt and flow.

All embodiments of the flux may be utilized with all American Welding Society (AWS) standard industrial silver/copper/zinc alloys. Accordingly, the preferred brazing alloy will vary depending upon the particular application in which it will be used.

As noted above, the preferred flux includes the following compounds in the associated percentages by weight:

| COMPOUND | PERCENTAGE BY WEIGHT |
| --- | --- |
| Potassium Fluoroborate | 26.3% |
| Boric Acid | 26.3% |
| Potassium Bifluoride | 23.8% |
| Potassium Tetraborate | 20.2% |
| Potassium Carbonate | 3.5% |

The preferred method includes the following steps:

Weighing each solid and liquid ingredient in separate clean, dry containers.

Adding potassium bifluoride into a stainless steel mixing bowl and mashing any clumps with a rubber hammer until only granules remain.

Adding boric acid on top of the potassium bifluoride.

Mixing the boric acid and potassium bifluoride at medium-low speed until a completely smooth wet paste is formed.

Adding de-ionized water to the paste as it begins to stiffen in order to keep a loose, smooth consistency, similar to that of cake frosting, and scraping the sides and bottom of the mixing bowl as needed to keep the mix even.

Adding potassium tetraborate and mixing at medium low speed until the mixture becomes smooth and creamy, adding additional de-ionized water to the mixture as it beings to stiffen, and scraping the sides and bottom of the mixing bowl as needed to keep the mix even.

Adding potassium fluoroborate and mixing at medium to medium low speed until smooth, adding additional de-ionized water to the mixture as it beings to stiffen, and scraping the sides and bottom of the mixing bowl as needed to keep the mix even.

Adding potassium carbonate to the paste and mixing until it is completely dissolved.

Stopping the mixer, scraping the sides and bottom of the bowl and the mixer blade, mixing again at medium speed.

Stopping the mixer and pouring the mixture into a stainless steel pan.

Placing the stainless steel pan into a pre-heated oven at approximately 560 degrees Fahrenheit for a period of four hours such that substantially all de-ionized water is dried from the mixture.

Removing the dried flux, milling to a powder and screening to a desired particle size.

As noted above, the resulting flux powder is non-corrosive and non-hygroscopic, and is readily said potassium fluoroborate is approximately 26% by weight, boric acid is approximately 26% by weight, potassium bifluoride is approximately 24% by weight, potassium tetraborate is approximately 20% by weight, and potassium carbonate is approximately 3.5% by weight.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A brazing flux compound comprising: potassium fluoroborate ranging from approximately 21% to 31% by weight, boric acid ranging from approximately 21% to 31% by weight, potassium bifluoride ranging from approximately 19% to 29% by weight, potassium tetraborate ranging from approximately 15% to 25% by weight, and potassium carbonate ranging from approximately 2.5% to 4.5% by weight.

2. The brazing flux compound of claim 1 further comprising a binder.

3. The brazing flux compound of claim 1 wherein said binder is de-ionized water.

4. The brazing flux compound of claim 2 wherein said brazing compound is a paste.

5. The brazing compound of claim 2 wherein said flux compound is dried into a powder and dispensed within a sheath of silver based filler material, to form a flux cored brazing composition.

6. The brazing flux compound of claim 1 wherein said potassium fluoroborate is approximately 26% by weight, boric acid is approximately 26% by weight, potassium bifluoride is approximately 24% by weight, potassium tetraborate is approximately 20% by weight, and potassium carbonate is approximately 3.5% by weight.

* * * * *